Jan. 30, 1934.  L. D. WALLS  1,945,471
STONE FLUTING AND MOLDING ATTACHMENT
Filed May 28, 1931  4 Sheets-Sheet 1

INVENTOR.
L. D. Walls
BY
Ehun Stewart
ATTORNEY.

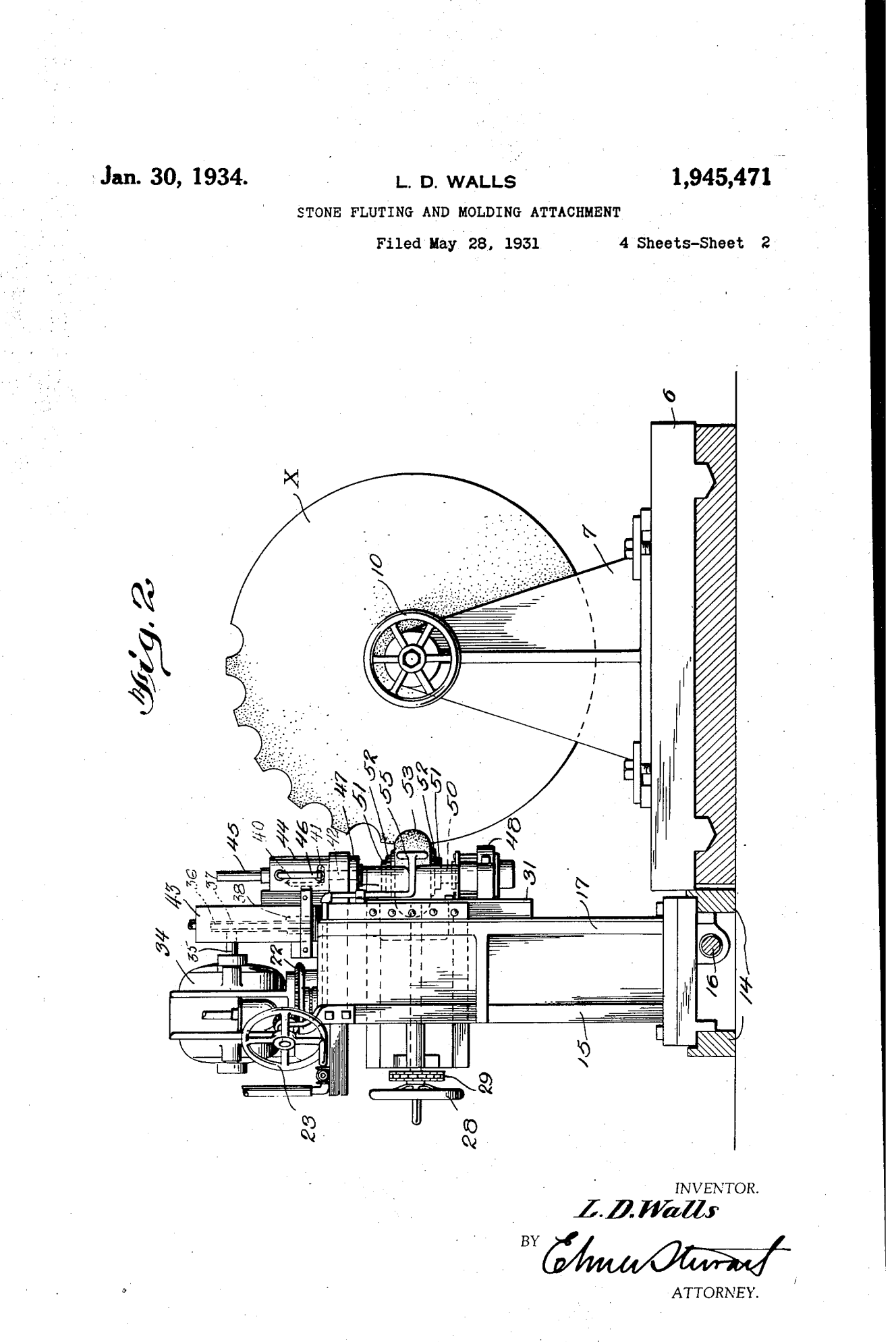

Jan. 30, 1934.  L. D. WALLS  1,945,471

STONE FLUTING AND MOLDING ATTACHMENT

Filed May 28, 1931  4 Sheets-Sheet 2

Fig. 2

INVENTOR.
L. D. Walls
BY Edmu Stewart
ATTORNEY.

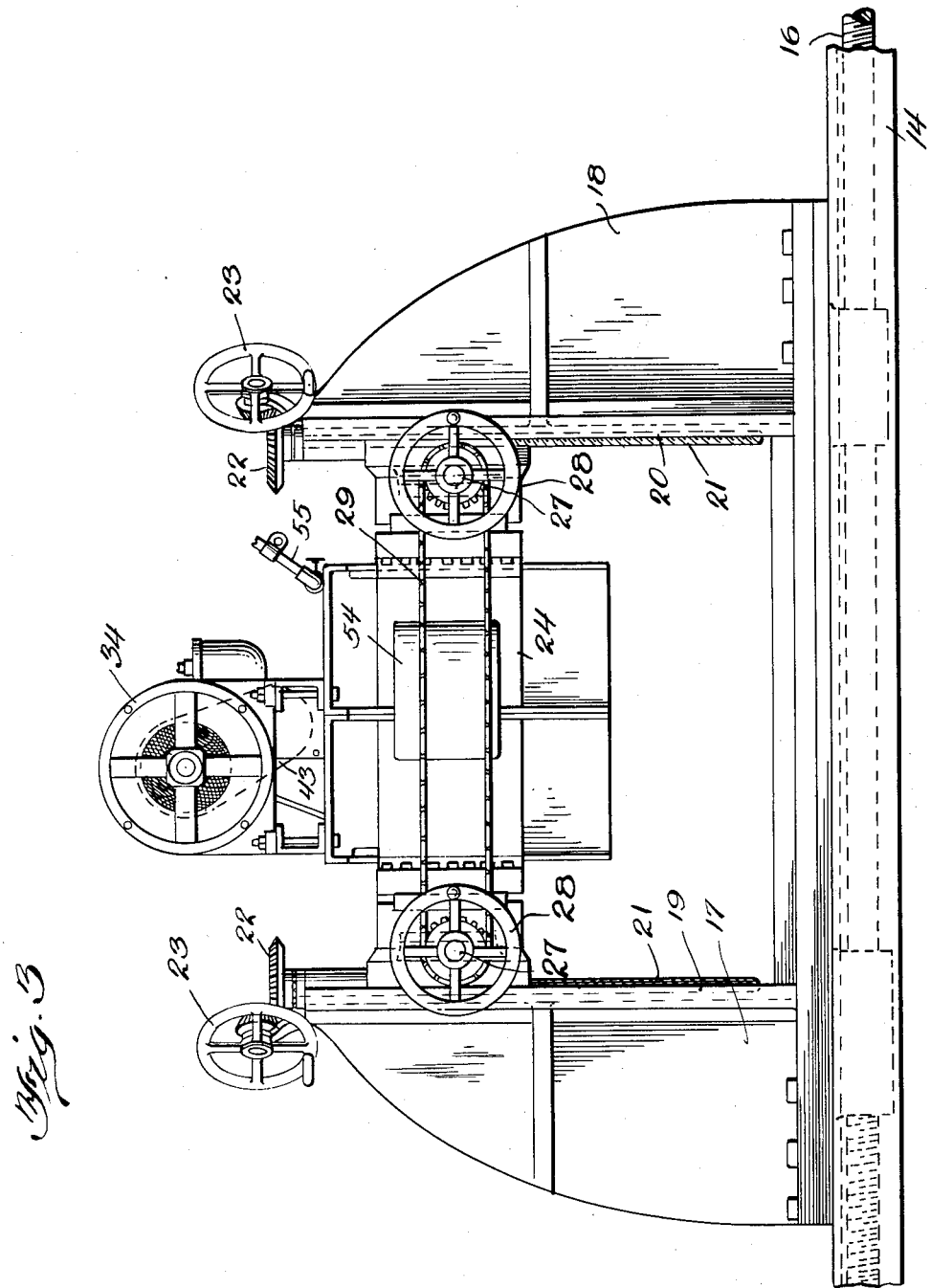

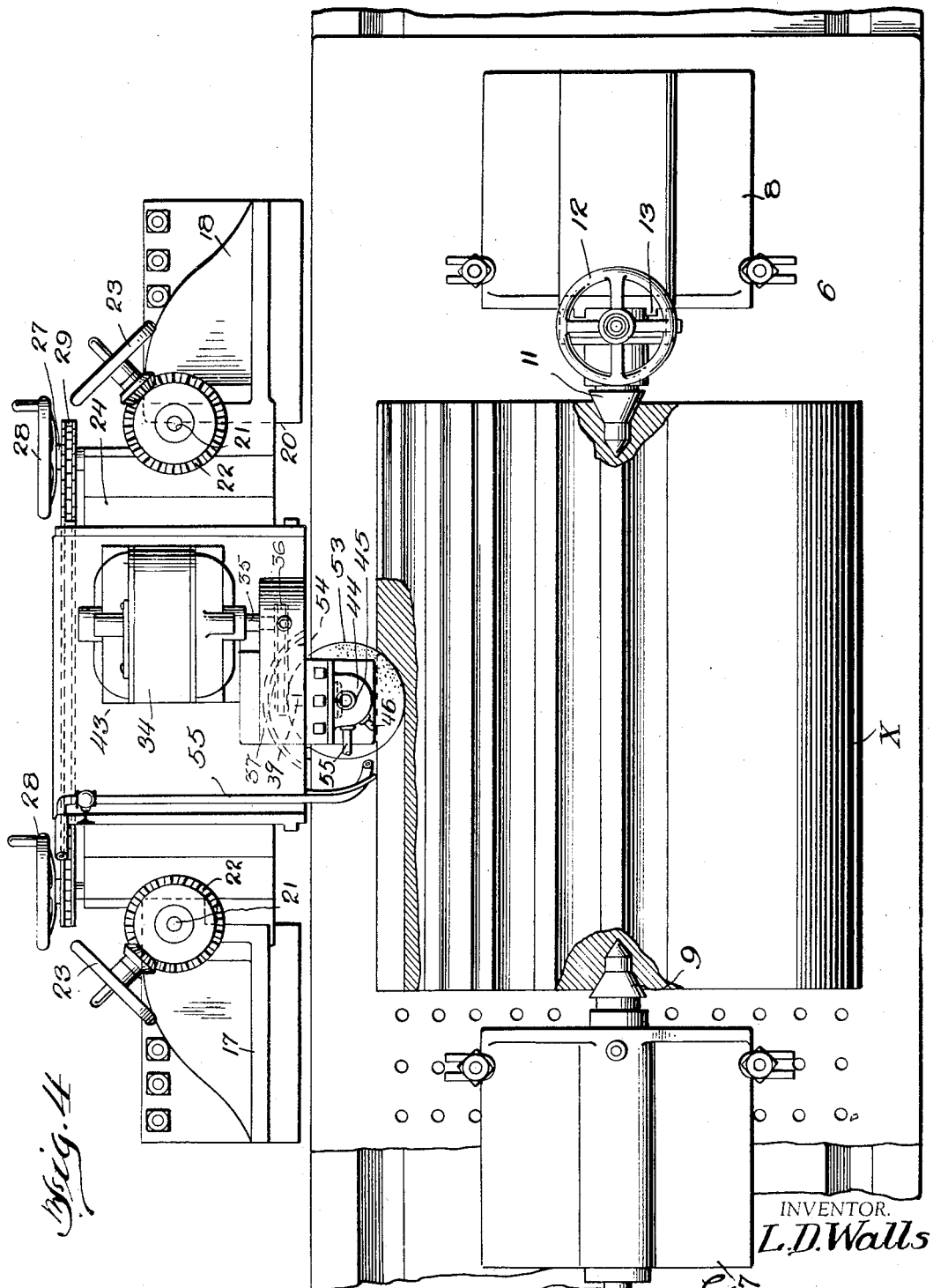

Patented Jan. 30, 1934

1,945,471

UNITED STATES PATENT OFFICE 1,945,471

STONE FLUTING AND MOLDING ATTACHMENT

Lowell D. Walls, Bloomington, Ind., assignor to Indiana Limestone Company, Bedford, Ind.

Application May 28, 1931. Serial No. 540,729

5 Claims. (Cl. 51—34)

This invention relates to novel improvements in an attachment for a stone header or like machine by which stone columns or bases may be fluted, planed or molded. In finishing column sections or other blocks it is desirable to minimize the handling of the large stone mass and to arrange it so that it may be tooled in the most speedy and effective manner. In devising this improvement consideration has been given to this fact and in addition the grinding tool has been mounted on a tool carrier which can be caused to traverse the work in the direction desired.

A further object of my invention is the assembly of the grinding attachment on a conventional carrier with due provision for adjustment relative to the work independently of the mechanism for traversing the grinding attachment.

Other objects of my invention will be noted from the following description of my improved device as illustrated in the accompanying drawings in which Fig. 1 is a perspective view;

Fig. 2 is a side elevation;

Fig. 3 is a rear view and

Fig. 4 is an enlarged plan view partly in section of the grinding attachment in operation on a column but omitting the tracks for the tool-carrying standard.

Figure 1:
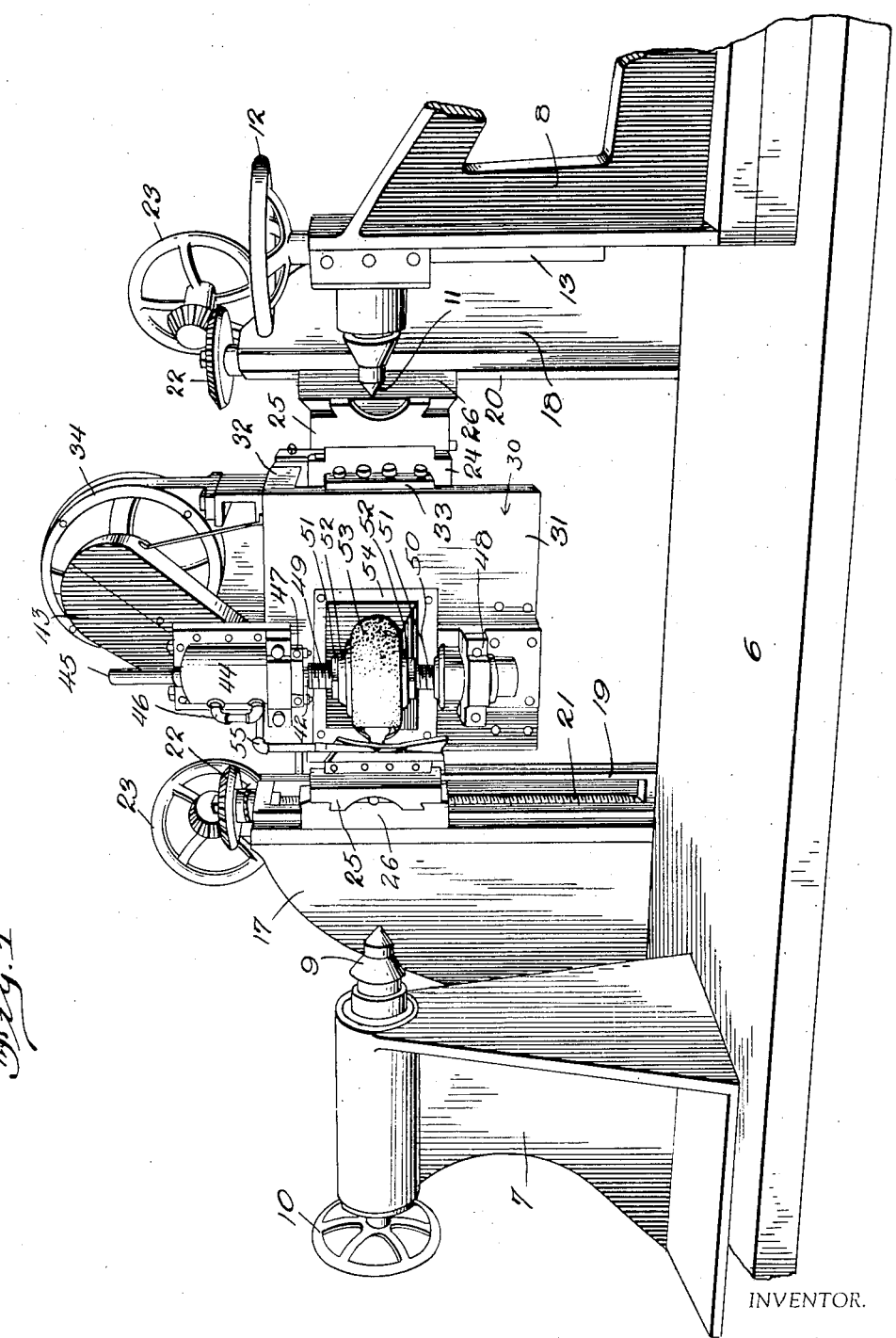

By way of example I have illustrated the preferred form of my invention in the accompanying drawings in which similar parts are indicated by the same numerals. The grinding attachment for fluting, planing and molding is mounted on a traveling carrier which traverses the work held stationary between tail-stocks clamped on a bed. Referring to the drawings the bed 6 is stationary and carries the tail-stocks 7, and 8 which are mounted in spaced relationship to accommodate a section of a column having its axis horizontally between the tail-stocks. The tail-stock 7 carries the usual center 9 which is horizontally adjusted in position by the hand wheel 10. The opposite tail-stock has the center 11 adjusted vertically by the hand-wheel 12 in the usual manner on the vertical track 13. The column of stone is mounted on the centers 9 and 11 in the manner indicated in Fig. 4.

On one side of the bed 6 there is provided a pair of tracks 14, 14 for supporting the header standard 15. This standard is moved along the tracks 14, 14 by means of a power-operated feed screw 16 in the usual manner.

The header standard comprises two opposed pedestals 17, 18 having guides 19 and 20 on their inner side surfaces. Adjusting screws 21, 21 are vertically disposed within the guides 19 and 20 and are operated through miter gears 22, 22 by means of hand-wheels 23, 23.

A header standard slide 24 is carried by opposed slides 25, 25 for horizontal adjustment on shoes 26, 26. The shoes 26, 26 travel on guides 19 and 20 and the screws 21, 21 are threaded through the shoes so that the latter may thus be elevated and depressed to bring the grinding attachment in proper position opposite the stone to be finished.

The horizontal adjustment of slides 25, 25 on shoes 26, 26 is carried out by adjusting screws 27, 27 extending rearwardly to handwheels 28, 28 and interconnected by the chain 29.

By the arrangement thus described the slide 24 may be adjusted in a vertical plane, and also in a horizontal plane and the header standards then caused to traverse the distance between the tail-stocks and the work carried thereby.

The grinding attachment proper consists of a frame 30 having a front vertical side 31 and a horizontal top plate 32. This frame is attached to the header slide 24 by means of plates 33, 33. The frame is therefore caused to move with the header slide in its adjustment and traverse.

The top 32 of the frame has an electric motor 34 mounted on it. The shaft 35 of the motor carries a pulley 36 and a belt or chain drive 37 connects this pulley with a pulley 38 on a counter shaft 39. Miter gears 40 and 41 connect the counter shaft 39 with a vertical drive shaft 42. The gear 41 is feathered on the shaft 42 so that the latter may be adjusted axially or vertically.

The drive 37 is protected by a housing 43 while the miter gears 40 and 41 are encased in a jacket 44 through which lubricant or cooling fluid may circulate through piping 45 and 46.

The shaft 42 is journaled in bearings 47 and 48, the lower one 48 being a thrust bearing. Both bearings are attached to the front face or side 31 of the frame.

The middle portion of the shaft 42 is screw-threaded in the right hand direction at 49 and left-handedly at 50. The nuts 51, 51 and washers 52, 52 are used to tighten the grinding wheel 53 to the shaft 42 in the desired position.

The grinding wheel 53 is rounded or otherwise formed to produce the desired form of flutes or molds. It may even be cylindrical if desired to grind plane faces.

The frame portion 31 is cut away behind the grinding wheel to receive a shield 54. Piping 55 is provided for delivering a spray of water on the periphery of the wheel.

The above description of the novel parts of my improved device will illustrate the invention. The block of stone X is centered on the centers 9 and 11 and adjusted into a horizontal axial plane. It is then held in position and indexed as the fluting progresses.

The header standard is adjusted to bring the grinding wheel 53 in the horizontal plane of the centers and advanced to make the desired depth of cut. The header standard is caused to traverse the stationary stone completing the fluting. The grinding operation may be carried out in each direction of travel. After the flute has been completed the block is indexed and the next flute made by a further grinding operation.

In carrying out this procedure the large mass of stone is held stationary during the grinding and only the tool caused to travel. The travel takes place along a horizontal direction permitting the tool to be held rigidly against undue strain. The tool is mounted on a frame which admits of use with the usual header mechanism or customary planer.

The adaptability of this device for use with wheels having straight faces, or of special molding contours will be apparent and similar variations in other details may be made. The device is adapted for use as an independently operating attachment on headers of the conventional type.

The above description and illustration has been given of the preferred form of my invention but no limitation thereon is to be inferred apart from the scope of the appended claims.

What I claim is:—

1. In combination with a traveling header having a pair of opposed standards with vertical guides, shoes on said guides, slides adjustable horizontally at right angles to the line of travel of the shoes, a member connecting the slides, a frame on the member and a rotary grinding member carried by the frame.

2. In combination with a horizontally traveling header having a pair of opposed standards with guides, shoes on said guides, slides adjustable laterally of the shoes, a member connecting the slides, a frame on the member said frame having a horizontal top overlying said connecting member and a depending front face, a grinding wheel on the front face of the frame, power means for said grinding wheel and means for adjusting the frame both vertically and horizontally away from the plane of the standards.

3. In combination with a horizontally traveling header having a pair of opposed standards with guides, shoes on said guides, slides, means for simultaneously adjusting said slides horizontally at right angles to the line of travel of the shoes, a member connecting the slides, a frame on the member said frame having a horizontally top overlying said connecting member and a depending front face, a grinding wheel on the front face of the frame and means for adjusting the said member vertically of the guides.

4. In combination with a header having a pair of opposed standards with guides, shoes on said guides, slides adjustable horizontally at right angles to the line of travel of the shoes, a member connecting the slides, a frame on the member, said frame having a horizontal top overlying said connecting member and a depending front face a grinding wheel on the front face of the frame, means for adjusting the frame both vertically and horizontally and means for moving the header longitudinally.

5. In combination with a horizontally traveling header having a pair of opposed standards with vertical guides, shoes slidable on said guides, slides adjustable horizontally on said shoes, a member connecting the slides and movable therewith, a frame on the member, said frame comprising a horizontal platform overlying the member and a depending face in front of said member, a grinding wheel mounted on a vertical shaft on said depending face, motive power means on the platform, power transmitting gearing from the said power means to said shaft and means for adjusting the frame vertically and also horizontally with respect to the plane of the standards.

LOWELL D. WALLS.